United States Patent
Mantell et al.

(10) Patent No.: US 11,794,255 B2
(45) Date of Patent: Oct. 24, 2023

(54) METHOD AND APPARATUS FOR FORMING OVERHANG STRUCTURES WITH A METAL DROP EJECTING THREE-DIMENSIONAL (3D) OBJECT PRINTER

(71) Applicants: Xerox Corporation, Norwalk, CT (US); Palo Alto Research Center Incorporated, Palo Alto, CA (US)

(72) Inventors: David A Mantell, Rochester, NY (US); Christopher T. Chungbin, Rochester, NY (US); Daniel Cormier, Pittsford, NY (US); David G. Tilley, Williamson, NY (US); Walter Hsiao, San Mateo, CA (US); PriyaankaDevi Guggilapu, Webster, NY (US); Michael F. Dapiran, Webster, NY (US); Dinesh Krishna Kumar Jayabal, Rochester, NY (US)

(73) Assignee: Xerox Corporation, Norwalk, CT (US)

(*) Notice: Subject to any disclaimer, the term of this patent is extended or adjusted under 35 U.S.C. 154(b) by 268 days.

(21) Appl. No.: 17/159,975

(22) Filed: Jan. 27, 2021

(65) Prior Publication Data

US 2022/0234111 A1 Jul. 28, 2022

(51) Int. Cl.
*B22F 10/85* (2021.01)
*B33Y 10/00* (2015.01)
(Continued)

(52) U.S. Cl.
CPC .............. *B22F 10/85* (2021.01); *B22F 10/22* (2021.01); *B22F 12/53* (2021.01); *B33Y 10/00* (2014.12); *B33Y 30/00* (2014.12); *B33Y 50/02* (2014.12)

(58) Field of Classification Search
CPC .......... B22F 10/20; B22F 10/22; B22F 10/25; B22F 10/80; B22F 10/85; B22F 12/50;
(Continued)

(56) References Cited

U.S. PATENT DOCUMENTS

| 9,616,494 | B2 | 4/2017 | Vader et al. |
| 10,040,119 | B2 | 8/2018 | Vader et al. |

(Continued)

FOREIGN PATENT DOCUMENTS

WO    WO-2021073717 A1 *   4/2021

OTHER PUBLICATIONS

European Patent Office, Extended European Search Report corresponding to European Patent Application No. 22 15 0505 (9 pages), dated Jun. 10, 2022, Munich, Germany.

*Primary Examiner* — Keith Walker
*Assistant Examiner* — Benjamin C Anderson
(74) *Attorney, Agent, or Firm* — Maginot Moore & Beck LLP

(57) ABSTRACT

A three-dimensional (3D) metal object manufacturing apparatus is operated to form sloping surfaces having a slope angle of more than 45° from a line that is perpendicular to the structure on which the layer forming the slope surface is formed. The angle corresponds to a step-out distance from the perpendicular line and a maximum individual step-out distance determined from empirically derived data. Multiple passes of an ejection head of the apparatus can be performed within a layer to form a sloped edge and the mass of the sloped structure is distributed within the sloped edge so the edge is formed without defects.

10 Claims, 3 Drawing Sheets

(51) Int. Cl.
*B33Y 30/00* (2015.01)
*B33Y 50/02* (2015.01)
*B22F 10/22* (2021.01)
*B22F 12/53* (2021.01)

(58) Field of Classification Search
CPC ......... B22F 12/53; B33Y 10/00; B33Y 30/00; B33Y 50/00; B33Y 50/02
See application file for complete search history.

(56) References Cited

U.S. PATENT DOCUMENTS

| | | | |
|---|---|---|---|
| 2017/0056970 A1* | 3/2017 | Chin | B22F 10/43 |
| 2020/0108441 A1* | 4/2020 | Jones | B29C 64/40 |
| 2020/0190988 A1* | 6/2020 | Osgood | F01D 5/147 |
| 2020/0324486 A1 | 10/2020 | Mantell et al. | |
| 2021/0096537 A1* | 4/2021 | Mantell | B33Y 50/00 |
| 2022/0032550 A1* | 2/2022 | Mantell | B29C 64/393 |
| 2022/0134418 A1* | 5/2022 | Herrmann | B22D 23/003 |
| | | | 164/154.6 |
| 2022/0212257 A1* | 7/2022 | Herrmann | B22F 12/70 |
| 2022/0212265 A1* | 7/2022 | Cormier | B22F 10/22 |
| 2022/0219238 A1* | 7/2022 | LeFevre | B41J 2/04 |
| 2022/0226888 A1* | 7/2022 | Giacobbi | B22F 12/50 |
| 2022/0234298 A1* | 7/2022 | Schweid | B22F 10/85 |
| 2022/0241865 A1* | 8/2022 | Elliot | B29C 64/112 |
| 2022/0241866 A1* | 8/2022 | Elliot | B29C 64/40 |
| 2022/0242048 A1* | 8/2022 | Tanchak | B22F 10/22 |

\* cited by examiner

METHOD AND APPARATUS FOR FORMING OVERHANG STRUCTURES WITH A METAL DROP EJECTING THREE-DIMENSIONAL (3D) OBJECT PRINTER

TECHNICAL FIELD

This disclosure is directed to melted metal ejectors used in three-dimensional (3D) object printers and, more particularly, to the formation of overhang structures in 3D objects manufactured with those systems.

BACKGROUND

Three-dimensional printing, also known as additive manufacturing, is a process of making a three-dimensional solid object from a digital model of virtually any shape. Many three-dimensional printing technologies use an additive process in which an additive manufacturing device forms successive layers of the part on top of previously deposited layers. Some of these technologies use ejectors that eject UV-curable materials, such as photopolymers or elastomers. The printer typically operates one or more extruders to form successive layers of the plastic material that form a three-dimensional printed object with a variety of shapes and structures. After each layer of the three-dimensional printed object is formed, the plastic material is UV cured and hardens to bond the layer to an underlying layer of the three-dimensional printed object. This additive manufacturing method is distinguishable from traditional object-forming techniques, which mostly rely on the removal of material from a work piece by a subtractive process, such as cutting or drilling.

Recently, some 3D object printers have been developed that eject drops of melted metal from one or more ejectors to form 3D objects. These printers have a source of solid metal, such as a roll of wire or pellets, that is fed into a heating chamber where the solid metal is melted and the melted metal flows into a chamber of the ejector. An uninsulated electrical wire is wrapped around the chamber. A pulse of electrical current is passed through the conductor to produce an electromagnetic field that causes the meniscus of the melted metal at a nozzle of the chamber to separate from the melted metal within the chamber and be propelled from the nozzle. A platform opposite the nozzle of the ejector is moved in a X-Y plane parallel to the plane of the platform by a controller operating actuators so the ejected metal drops form metal layers of an object on the platform and another actuator is operated by the controller to alter the position of the ejector or platform in the vertical or Z direction to maintain a constant distance between the ejector and an uppermost layer of the metal object being formed. This type of metal drop ejecting printer is also known as a magnetohydrodynamic printer.

All 3D object printers must be able to print some portion of the object material that is not completed supported by previously printed object material to form structures such as angled surfaces or overhangs. Some 3D printers that use processes such as SLA or SLS use the previously printed material as support in forming such structures. Other 3D object printers, such as Objet printers, build support structures using material different than the object material. These support structures are later removed after the object construction is completed. Extrusion 3D object printers can form overhangs and angled surfaces without having to build support structures. Angled surfaces formed with these printers, however, can deviate from the vertical by no more than about 45°. Being able to form angled surfaces at angles of greater 45° without requiring the building of support structures would be beneficial.

SUMMARY

A new method of operating a 3D metal object printer can form angled surfaces greater than 45° without requiring the building of support structures. The method includes identifying sloped edges to be formed for each portion of a perimeter in a layer of an object to be formed by the metal drop ejecting apparatus, using a maximum individual step-out distance to generate machine-ready instructions that operate the metal drop ejecting apparatus to form the identified sloped edges at each portion of the perimeter in the layer of the object to be formed, and executing the generated machine-ready instructions to operate the metal drop ejecting apparatus to form the sloped edges at each portion of the perimeter in the layer of the object to be formed.

A new 3D metal object printer can form angled surfaces greater than 45° without requiring the building of support structures. The 3D metal object printer includes a melter configured to receive and melt a bulk metal, an ejection head having a nozzle that is fluidly connected to the melter to receive melted bulk metal from the melter, a platform positioned opposite the ejection head, at least one actuator operatively connected to at least one of the platform and the at least one ejection head, the at least one actuator being configured to move the at least one of the platform and the at least one ejection head relative to one another, and a controller operatively connected to the melter, the at least one ejection head, and the at least one actuator. The controller is configured to identify sloped edges to be formed for each portion of a perimeter in a layer of an object to be formed by the metal drop ejecting apparatus, use a maximum individual step-out distance to generate machine-ready instructions that operate the metal drop ejecting apparatus to form the identified sloped edges at each portion of the perimeter in the layer of the object to be formed, and execute the generated machine-ready instructions to operate the metal drop ejecting apparatus to form the sloped edges at each portion of the perimeter in the layer of the object to be formed.

BRIEF DESCRIPTION OF THE DRAWINGS

The foregoing aspects and other features of a method of operating a 3D metal object printer that can form angled surfaces greater than 45° without requiring the building of support structures are explained in the following description, taken in connection with the accompanying drawings.

DETAILED DESCRIPTION

Figure 1A:
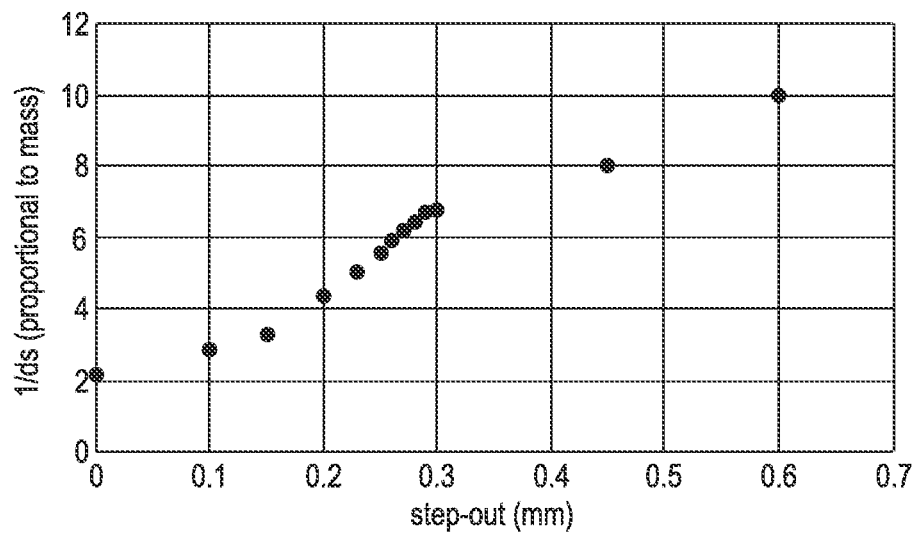
FIG. 1A is a graph of empirically obtained data for the reciprocal of drop spacing, which is proportional to metal drop mass, vs. step-out that can be obtained with a metal drop ejecting printer.

For a general understanding of the environment for the 3D metal object printer and its operation as disclosed herein as well as the details for the printer and its operation, reference is made to the drawings. In the drawings, like reference numerals designate like elements.

Figure 3:
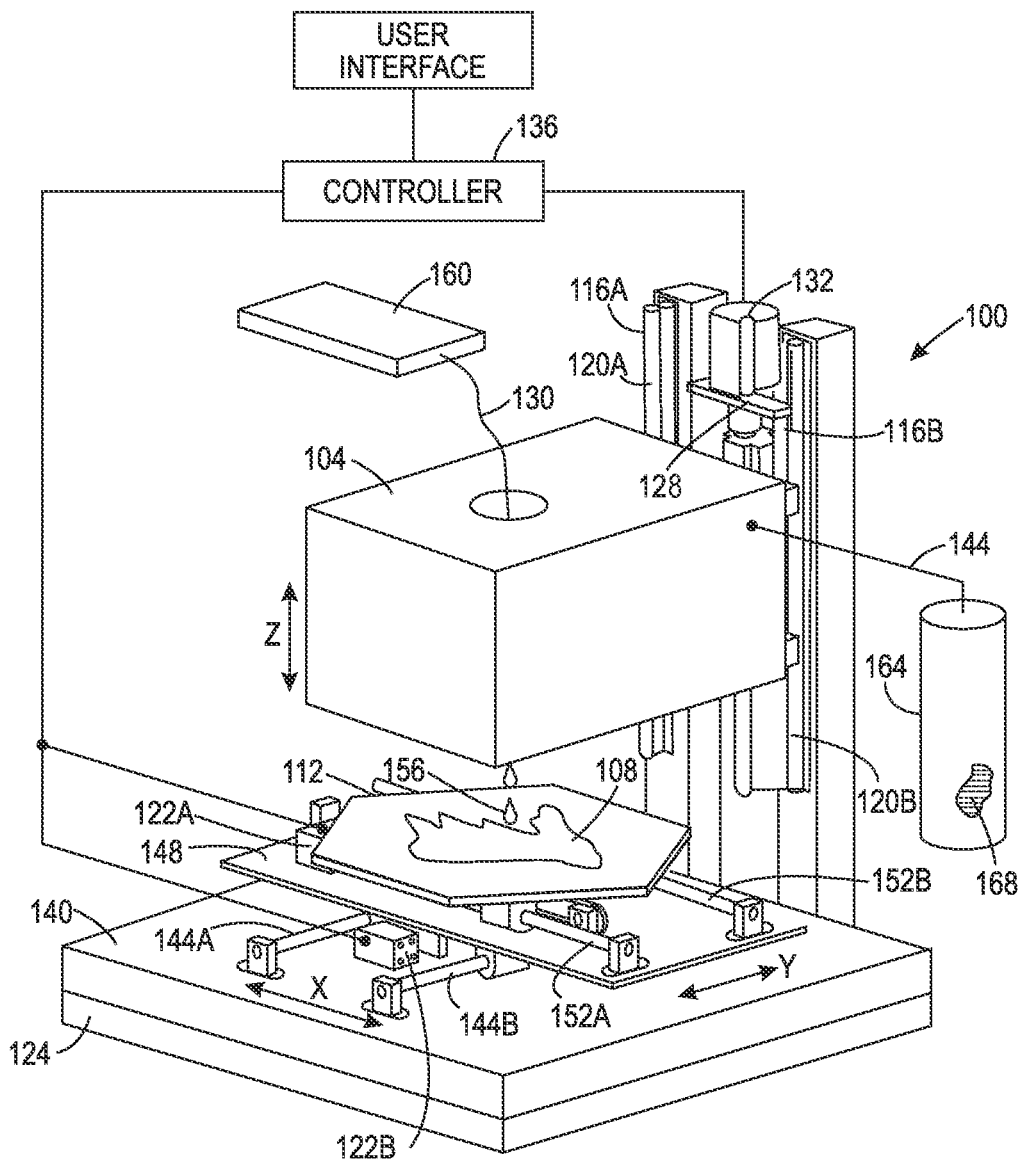
FIG. 3 depicts a prior art 3D metal object printer.

FIG. 3 illustrates an embodiment of a prior art melted metal 3D object printer 100 that can be equipped with a modified controller to produce angled surfaces that deviate from the vertical by up to 45° and more. In the printer of FIG. 3, drops of melted bulk metal are ejected from an ejector head 104 having a single nozzle and drops from the nozzle form swaths for layers of an object 108 on a platform 112. As used in this document, the term "bulk metal" means conductive metal available in aggregate form, such as wire of a commonly available gauge or pellets of macro-sized proportions. A source of bulk metal 160, such as metal wire 130, is fed into the ejector head and melted to provide melted metal for a chamber within the ejector head. An inert gas supply 164 provides a pressure regulated source of an inert gas 168, such as argon, to the chamber of melted metal in the ejector head 104 through a gas supply tube 144 to prevent the formation of metal oxide in the ejector head.

The ejector head 104 is movably mounted within z-axis tracks 116A and 116B in a pair of vertically oriented members 120A and 120B, respectively. Members 120A and 120B are connected at one end to one side of a frame 124 and at another end to one another by a horizontal member 128. An actuator 132 is mounted to the horizontal member 128 and operatively connected to the ejector head 104 to move the ejector head along the z-axis tracks 116A and 116B. The actuator 132 is operated by a controller 136 to maintain a distance between the multiple nozzles (not shown in FIG. 3) of the ejector head 104 and an uppermost surface of the object 108 on the platform 112.

Mounted to the frame 124 is a planar member 140, which can be formed of granite or other sturdy material to provide reliably solid support for movement of the platform 112. Platform 112 is affixed to X-axis tracks 144A and 144B so the platform 112 can move bidirectionally along an X-axis as shown in the figure. The X-axis tracks 144A and 144B are affixed to a stage 148 and stage 148 is affixed to Y-axis tracks 152A and 152B so the stage 148 can move bidirectionally along a Y-axis as shown in the figure. Actuator 122A is operatively connected to the platform 112 and actuator 122B is operatively connected to the stage 148. Controller 136 operates the actuators 122A and 122B to move the platform along the X-axis and to move the stage 148 along the Y-axis to move the platform in an X-Y plane that is opposite the ejector head 104. Performing this X-Y planar movement of platform 112 as drops of molten metal 156 are ejected toward the platform 112 forms a swath of melted metal drops on the object 108. Controller 136 also operates actuator 132 to adjust the vertical distance between the ejector head 104 and the most recently formed layer on the substrate to facilitate formation of other structures on the object. While the molten metal 3D object printer 100 is depicted in FIG. 3 as being operated in a vertical orientation, other alternative orientations can be employed. Also, while the embodiment shown in FIG. 3 has a platform that moves in an X-Y plane and the ejector head moves along the Z axis, other arrangements are possible. For example, the ejector head 104 can be configured for movement in the X-Y plane and along the Z axis.

The controller 136 can be implemented with one or more general or specialized programmable processors that execute programmed instructions. The instructions and data required to perform the programmed functions can be stored in memory associated with the processors or controllers. The processors, their memories, and interface circuitry configure the controllers to perform the operations previously described as well as those described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits. During metal object formation, image data for a structure to be produced are sent to the processor or processors for controller 136 from either a scanning system or an online or work station connection for processing and generation of the ejector head control signals output to the ejector head 104.

The controller 136 of the melted metal 3D object printer 100 requires data from external sources to control the printer for metal object manufacture. In general, a three-dimensional model or other digital data model of the object to be formed is stored in a memory operatively connected to the controller 136, the controller can access through a server or the like a remote database in which the digital data model is stored, or a computer-readable medium in which the digital data model is stored can be selectively coupled to the controller 136 for access. This three-dimensional model or other digital data model is processed by a slicer implemented with the controller to generate machine-ready instructions for execution by the controller 136 in a known manner to operate the components of the printer 100 and form the metal object corresponding to the model. The generation of the machine-ready instructions can include the production of intermediate models, such as when a CAD model of the device is converted into an STL data model, or other polygonal mesh or other intermediate representation, which can in turn be processed to generate machine instructions, such as g-code, for fabrication of the device by the printer. As used in this document, the term "machine-ready instructions" means computer language commands that are executed by a computer, microprocessor, or controller to operate components of a 3D metal object additive manufacturing system to form metal objects on the platform 112. The controller 136 executes the machine-ready instructions to control the ejection of the melted metal drops from the ejector head 104, the positioning of stage 148 and the platform 112, as well as the distance between the ejector head 102 and the uppermost layer of the object 108 on the platform 112.

Figure 1B:
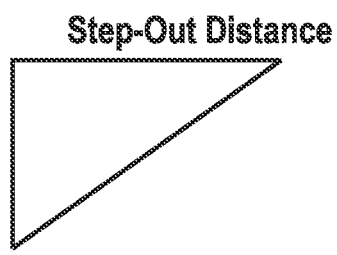
FIG. 1B illustrates a step-out to be formed for an object layer.

The graph shown in FIG. 1A depicts the amount of step-out that can be obtained within the single layer of an object corresponding to the digital data model of an object versus the mass of the drops distributed over the step-out being formed. The horizontal axis of the graph is the amount of step-out in mm and the vertical axis is 1/(the drop spacing) in mm, which is proportional to the mass of the drops distributed over the step-out distance. As used in this document, the term "step-out" means the distance from a line that is perpendicular to an edge of a previously formed layer to the edge of the layer being formed. It is illustrated in FIG. 1B. This step-out comes from the surface of the part as it intersects the plane of the previous layer and the plane of the current layer. It is the average of the angle of the surface in the vertical direction between the layers.

A metal drop ejector head has a limit to the step-out distance that can be obtained in a single pass of the ejector head along a perimeter. As used in this document, the term "single pass" means a single traversing of a perimeter while the ejector head is ejecting metal drops. The term "multi-pass" means more than one traversing of a perimeter while the ejector head is ejecting metal drops and the height of the multiple passes corresponds to a height of a single layer in the object being formed. In one embodiment, the step-out distance limit is 0.25 mm, which means the largest step-out distance that can be obtained in a single pass is 0.25 mm. Thus, reciprocals of step-out distances up to a step-out distance of 0.25 mm can be performed in a single pass using the corresponding drop spacing distance reciprocal identified from the graph of FIG. 1A. Thus, as the step-out distance increases for a single pass, the drop spacing decreases. For example, a single step-out distance of 0.1 mm correlates to a reciprocal of a drop spacing distance of about 3 so if 1/(drop spacing distance) is 3 then the drop spacing distance is ⅓ mm or 0.333 mm while a single step-out distance of 0.2 mm corresponds with a reciprocal of drop distance a little greater than 4 so the drop spacing distance decreases to approximately 0.25 mm. FIG. 1A demonstrates that as the step-out distance for a step-out formed in a single pass increases, the reciprocal of the drop spacing distance decreases. As used in this document, the term "drop spacing distance" means the distance between the center of a drop fully supported by a previously formed layer and the center of a drop partially supported by the previously formed layer that forms the step-out. The reciprocal of drop spacing distance is proportional to the mass of the drops ejected to form a line. That is, as the drop spacing distance decreases the mass of material ejected for the step-out increases. As used in this document, the term "fully supported drop" means a drop in a perimeter within a layer, sometimes called an inner perimeter in this document, or a drop at an end of an infill area adjacent to a first (or only) drop forming a step-out edge.

For step-outs larger than the maximum step-out distance, which is 0.25 mm in the example being used, multiple passes have to be performed. Thus, a step-out of 0.45 mm requires a first pass having a 0.25 mm step-out followed by another pass having a 0.20 mm step-out from the first pass to obtain the 0.45 mm step-out for the layer. Referring to the graph of FIG. 1A, the step-out distance of 0.45 mm correlates with a reciprocal of the drop spacing of 8, which corresponds to a drop spacing distance of 0.125 mm. Thus, the mass of metal ejected to form a 0.45 mm step-out corresponds to a drop spacing of 0.125 mm. Because two passes are required to form the 0.45 mm step-out, the drop spacing for each pass is selected to be 2×0.125 mm, which is 0.25 mm because a greater drop spacing produces less mass for the line formed during a pass but together the two passes are like the mass of a line with having a drop spacing of 0.125 mm. Thus, the slicer generates machine-ready instructions that operate the printer to move the ejector head 204 along a tool path at a drop spacing of 0.25 mm to produce a step-out of 0.25 mm on a previously formed layer edge followed by a movement of the ejector head at the drop spacing of 0.25 mm to form a step-out of 0.20 mm from the first pass step-out to achieve the step-out of 0.45 mm for the layer. Alternatively, the amount of step-out distance can be divided by the number of passes needed to form the step-out so equal step-out passes are used to form the step-out. In the current example, equal step-outs of 0.225 mm can also achieve the step-out of 0.45 mm in two passes. The drop spacing for these two passes are determined using the graph of FIG. 1A.

As used in this document, the term "tool path" means relative movement between a nozzle of an ejection head and a platform on which an object is being manufactured while the ejection head is being operated to form structure within the object. While this example uses the mass proportionality of 1/N, where N is the drop spacing distance used to distribute the metal mass ejected by the ejector head during each pass within a layer, other proportionalities can be used. For example, if the maximum step-out is 0.2 mm, then a step-out of 0.45 mm can be obtained with three passes with the first pass having a step-out of 0.20 mm, the second pass having a step-out of 0.20 mm, and the third pass having a step-out of 0.05 mm. Alternatively, the step-out of 0.45 can also be obtained with equal step-outs of 0.15 mm formed using three passes. The object is to have the ejector head distribute a portion of the metal mass required for a step-out corresponding to a step-out distance in the graph of FIG. 1A over one or more passes without exceeding the maximum step-out distance that can be obtained in a single pass. The number of passes is the step-out distance divided by the maximum step-out distance rounded up to the nearest integer value.

One additional fine tuning to the algorithm is the placement of the inner perimeter with respect to the multiple outer perimeters. For a single pass, the inner perimeter or infill is placed at some distance from the outer perimeter. For multi-pass larger step-out distances, however, the spacing between the innermost pass and the inner perimeter may need to be adjusted. The multiple passes essentially produce an outer perimeter that is distributed over the multiple step-outs and the extent of this outer perimeter is greater than the perimeter before the step-out is formed. Consequently, the inner perimeter or infill may need to overlap this region that the innermost pass and inner perimeter share more than they would need to overlap this same region for a single pass step-out formation. The greater the step-out distance, the greater the need for more overlap.

Figure 2:
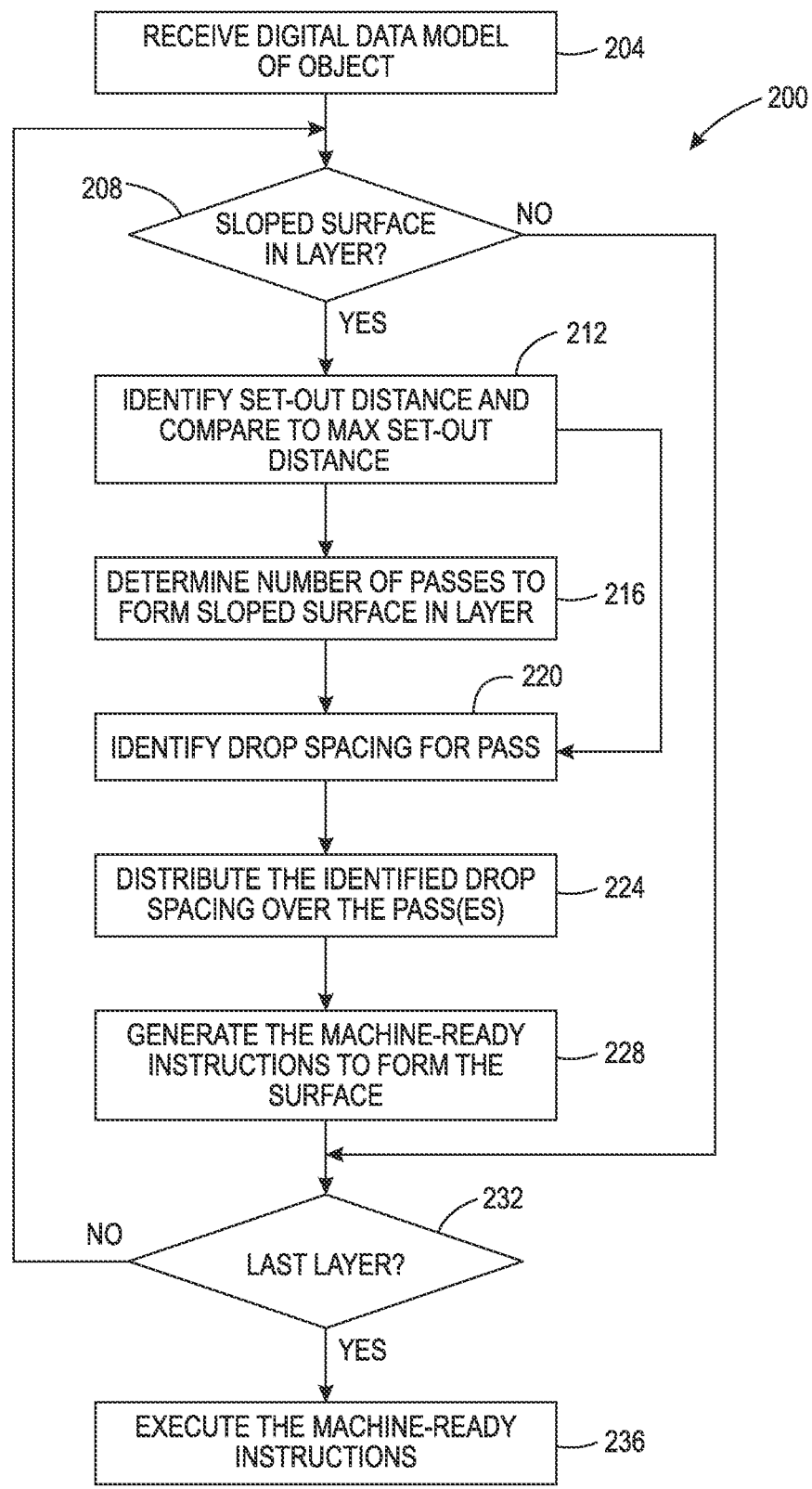
FIG. 2 is a flow diagram of method for operating a 3D metal object printer that that can form angled surfaces greater than 45° without requiring the building of support structures.

A process for operating a metal drop ejecting printer to obtain step-outs greater than 45° in slope is shown in FIG. 2. In the description of the process, statements that the process is performing some task or function refers to a controller or general purpose processor executing programmed instructions stored in non-transitory computer readable storage media operatively connected to the controller or processor to manipulate data or to operate one or more components in the printer to perform the task or function. The controller 136 noted above can be such a controller or processor. Alternatively, the controller can be implemented with more than one processor and associated circuitry and components, each of which is configured to form one or more tasks or functions described herein. Additionally, the steps of the method may be performed in any feasible chronological order, regardless of the order shown in the figures or the order in which the processing is described.

FIG. 2 is a flow diagram of a process that operates a metal drop ejecting printer, such as printer 10, to form step-outs having slopes greater than 45°. The process 200 begins with the slicer receiving the digital data model for the object to be produced (block 204). For any layers in which sloped edges or portions of sloped edges are to be formed (block 208), the process identifies the step-out distance for the layer and compares it to the maximum limit for an individual step-out distance for a pass from a previous layer or pass (block 212). As used in this document, the term "sloped edge" means a feature in a layer of an object that requires at least one step-out for its formation. Otherwise, the sloped surface processing is skipped. If the identified step-out distance to be achieved in the layer exceeds the maximum individual pass limit, the process determines the number of passes required to form the sloped edge (block 216). The drop spacing for the identified step-out distance is then determined using the graph of empirically obtained data, which can be implemented in a look-up table stored in the memory of the controller (block 220). This identified drop spacing is distributed over a single pass, if the maximum step-out distance was not exceeded, or it is distributed over each pass in the determined number of multiple passes required for the layer (block 224). The slicer then generates the machine-ready instructions that operate the actuators and ejector head of the printer to form the sloped surface in the layer and stores them in the program for operating the printer (block 228). After the last layer of the object in the digital data model is processed (block 232), the controller executes the machine-ready instructions to form the metal object (block 236).

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A metal drop ejecting apparatus comprising:
   a melter configured to receive and melt a bulk metal;
   at least one ejection head having a nozzle that is fluidly connected to the melter to receive melted bulk metal from the melter;
   a platform positioned opposite the ejection head;
   at least one actuator operatively connected to at least one of the platform and the at least one ejection head, the at least one actuator being configured to move at least one of the platform and the at least one ejection head relative to one another; and
   a controller operatively connected to the melter, the at least one ejection head, and the at least one actuator, the controller being configured with a first group of machine-ready instructions stored in a non-transitory computer readable media that cause the controller when the first group of machine-ready instructions are executed by the controller to:
      identify sloped edges to be formed for each portion of a perimeter in a layer of an object to be formed by the metal drop ejecting apparatus;
      use a maximum individual step-out distance to generate additional machine-ready instructions that operate the metal drop ejecting apparatus to form the identified sloped edges at each portion of the perimeter in the layer of the object to be formed; and
      execute the generated additional machine-ready instructions to operate the metal drop ejecting apparatus to form the sloped edges at each portion of the perimeter in the layer of the object to be formed; and
   the controller being further configured with a second group of machine-ready instructions stored in the non-transitory computer readable media that cause the controller when the second group of machine-ready instructions are executed by the controller to:
      identify a step-out distance for each identified sloped edge for each portion of the perimeter to be formed in the layer of the object; and
      identify a number of passes for forming each identified sloped edge for each portion of the perimeter using the identified step-out distance for each identified sloped edge at each portion of the perimeter and the maximum individual step-out distance; and
   the controller being further configured with a third group of machine-ready instructions stored in the non-transitory computer readable media that cause the controller when the third group of machine-ready instructions are executed by the controller to:
      identify the number of passes for at least one identified sloped edge as being greater than one.

2. The apparatus of claim 1, the controller being further configured with a fourth group of machine-ready instructions stored in the non-transitory computer readable media that cause the controller when the fourth group of machine-ready instructions are executed by the controller to:
   distribute the identified step-out distance for each identified sloped edge for each portion of the perimeter to be formed in the layer of the object over the identified number of passes.

3. The apparatus of claim 2, the controller being further configured with a fifth group of machine-ready instructions stored in the non-transitory computer readable media that cause the controller when the fifth group of machine-ready instructions are executed by the controller to:
   identify an equal amount of the identified step-out distance for each pass in the identified number of passes for at least one of the portions of the perimeter for at least one of the identified sloped edges.

4. The apparatus of claim 3, the controller being further configured with a sixth group of machine-ready instructions stored in the non-transitory computer readable media that cause the controller when the sixth group of machine-ready instructions are executed by the controller to:
   identify the equal amount of the identified step-out distance for each pass as being the maximum individual step-out distance.

5. The apparatus of claim 2, the controller being further configured with a seventh group of machine-ready instructions stored in the non-transitory computer readable media that cause the controller when the seventh group of machine-ready instructions are executed by the controller to:
   identify an amount of the identified step-out distance for at least one of the passes in the identified number of passes for at least one of the portions of the perimeter of at least one of the identified sloped edges as being different that an amount of the identified step-out distance distributed to another one of the passes in the identified number of passes for at least another one of the portions of the perimeter for the at least one of the identified sloped edges.

6. The apparatus of claim 2, the controller being further configured with an eighth group of machine-ready instructions stored in the non-transitory computer readable media that cause the controller when the eighth group of machine-ready instructions are executed by the controller to:
   distribute the maximum step-out distance to each pass in the identified number of passes for forming at least one sloped edge for at least one portion of the perimeter in the layer except a last pass to be performed; and
   distribute the portion of the identified step-out distance to the last pass that is equal to the step-out distance less a total of the maximum step-out distances distributed to the other passes in the identified number of passes.

7. A metal drop ejecting apparatus comprising:
   a melter configured to receive and melt a bulk metal;
   at least one ejection head having a nozzle that is fluidly connected to the melter to receive melted bulk metal from the melter;
   a platform positioned opposite the ejection head;

at least one actuator operatively connected to at least one of the platform and the at least one ejection head, the at least one actuator being configured to move at least one of the platform and the at least one ejection head relative to one another; and a controller operatively connected to the melter, the at least one ejection head, and the at least one actuator, the controller being configured with a first group of machine-ready instructions stored in a non-transitory computer readable media that cause the controller when the first group of machine-ready instructions are executed by the controller to:

identify sloped edges to be formed for each portion of a perimeter in a layer of an object to be formed by the metal drop ejecting apparatus;

use a maximum individual step-out distance to generate additional machine-ready instructions that operate the metal drop ejecting apparatus to form the identified sloped edges at each portion of the perimeter in the layer of the object to be formed; and execute the generated additional machine-ready instructions to operate the metal drop ejecting apparatus to form the sloped edges at each portion of the perimeter in the layer of the object to be formed; and the controller being further configured with a second group of machine-ready instructions stored in the non-transitory computer readable media that cause the controller when the second group of machine-ready instructions are executed by the controller to:

identify a step-out distance for each identified sloped edge for each portion of the perimeter to be formed in the layer of the object; and identify a number of passes for forming each identified sloped edge for each portion of the perimeter using the identified step-out distance for each identified sloped edge at each portion of the perimeter and the maximum individual step-out distance; and the controller being further configured with a third group of machine-ready instructions stored in the non-transitory computer readable media that cause the controller when the third group of machine-ready instructions are executed by the controller to:

identify the step-out distance for at least one identified sloped edge for at least one of the portions of the perimeter as being less than the maximum individual step-out distance; and the controller being further configured with a fourth group of machine-ready instructions stored in the non-transitory computer readable media that cause the controller when the fourth group of machine-ready instructions are executed by the controller to:

identify the number of passes for the at least one identified sloped edge for the at least one of the portions of the perimeter as being one; and the controller being further configured with a fifth group of machine-ready instructions stored in the non-transitory computer readable media that cause the controller when the fifth group of machine-ready instructions are executed by the controller to:

identify a drop spacing for formation of the at least one identified sloped edge for the at least one of the portions of the perimeter during the one pass, the drop spacing decreasing as the identified step-out distance for the at least one identified sloped edge for the at least one portion of the perimeter approaches the maximum individual step-out distance.

8. The apparatus of claim 7, the controller being further configured with a sixth group of machine-ready instructions stored in the non-transitory computer readable media that cause the controller when the sixth group of machine-ready instructions are executed by the controller to:

identify a drop spacing between a fully supported drop and a drop forming the at least one identified sloped edge for the at least one of the portions of the perimeter in the layer.

9. The apparatus of claim 8, the controller being further configured with a seventh group of machine-ready instructions stored in the non-transitory computer readable media that cause the controller when the seventh group of machine-ready instructions are executed by the controller to:

identify the step-out distance for at least one of the identified sloped edges for at least one of the portions of the perimeter as corresponding to an angle of more than 45° from a perpendicular line to a structure on which the layer of the object is to be formed.

10. The apparatus of claim 8, the controller being further configured with a seventh group of machine-ready instructions stored in the non-transitory computer readable media that cause the controller when the seventh group of machine-ready instructions are executed by the controller to:

identify the step-out distance for at least one of the identified sloped edges for at least one of the portions of the perimeter as corresponding to an angle of at least 60° from the perpendicular line to the structure on which the layer of the object is formed.

\* \* \* \* \*